United States Patent [19]

Coetzee

[11] Patent Number: 4,787,648

[45] Date of Patent: Nov. 29, 1988

[54] SUSPENSION MECHANISM

[75] Inventor: Abel O. Coetzee, London, Great Britain

[73] Assignee: International Bicycle Corporation, Tortola, British Virgin Isls.

[21] Appl. No.: 904,344

[22] Filed: Sep. 5, 1986

[51] Int. Cl.⁴ .................. B62K 3/02; B62K 25/04
[52] U.S. Cl. .................. 280/275; 280/281 R
[58] Field of Search .......... 280/275, 283, 286, 281 R, 280/200, 210, 259, 270, 274, 278, 694, 688; 180/219

[56] References Cited

U.S. PATENT DOCUMENTS

| | | | |
|---|---|---|---|
| 392,523 | 11/1888 | Owen | 280/275 |
| 402,313 | 4/1889 | Duryea | 280/283 |
| 434,234 | 8/1890 | Barker | 280/283 |
| 621,942 | 3/1899 | Pierce | 280/275 |
| 1,114,855 | 10/1914 | Buckland | 280/275 |
| 1,438,919 | 12/1922 | Kelly | 280/275 |
| 1,745,963 | 2/1930 | Trouche | 280/283 |
| 2,162,762 | 6/1939 | Snell | 280/283 |
| 2,187,238 | 1/1940 | Judd | 280/283 |
| 2,756,071 | 7/1956 | Riva | 280/283 |
| 3,521,904 | 7/1970 | Sheffer | 280/283 |
| 3,880,449 | 4/1975 | Wada | 280/283 |
| 4,648,616 | 3/1987 | Dickmann | 280/281 R |

FOREIGN PATENT DOCUMENTS 92092 8/1936 Austria .
459750 5/1928 Fed. Rep. of Germany .

Primary Examiner—David M. Mitchell
Assistant Examiner—Everett G. Diederiks, Jr.
Attorney, Agent, or Firm—Rines and Rines Shapiro and Shapiro

[57] ABSTRACT

A suspension mechanism includes a pair of generally oppositely directed support arms which may be connected to support forks for the wheels of a bicycle, the support arms being pivotably mounted about a common with respect to a load bearing member to which a bicycle saddle may be mounted. The support arms are urged away from the load bearing member by a biasing arrangement which may be in the form of a leaf spring set.

19 Claims, 3 Drawing Sheets

SUSPENSION MECHANISM

INTRODUCTION TO THE INVENTION

This invention relates to a suspension mechanism which is particularly suitable in suspensions for vehicles.

In this specification extensive reference will be made to bicycles in both the disclosure of the invention and the description of the preferred embodiment. This should not be construed as limiting the nature or application of the invention.

SUMMARY OF THE INVENTION

According to the invention a suspension mechanism comprises a pair of arms extending oppositely and generally collinearly from pivot positions having parallel axes, each arm being pivotable with respect to a centrally located load bearing member fixed relative to the pivot positions, and biasing means extending between each support arm and the load bearing member to bias the support arms to support the load bearing member under load in use.

Further according to the invention the biasing means extending between the load bearing member and the support arms are independently operable.

Still further according to the invention the axes of the pivot positions of the support arms are co-axial.

The biasing means may comprise, for example, one or more elastomeric members, fluid filled compression members, coil springs or leaf springs.

Each biasing means may be fixed with respect to the load bearing member and floating with respect to the support arm, acting on a suitable bearing formation of the support arm.

The biasing means may be in the form of a single leaf spring set including at least one leaf spring, centrally fixed with respect to the load bearing member and extending between the two support arms.

Still further according to the invention the load bearing member and the two support arms may be independently mounted to co-axial cylindrical members which are rotatable with respect to each other.

More particularly, the load bearing member may be mounted to an outer cylindrical member with the support arms being mounted to middle and inner cylindrical members.

To this end, the invention provides an arrangement in which the support arm mounted to the inner cylindrical member projects through suitable apertures in the middle and outer cylindrical members, and the support arm mounted to the middle cylindrical member projects through a suitable aperture in the outer cylindrical member.

Preferably according to the invention, the apertures in the middle and outer cylindrical members act as stops to limit pivotal movement of the support arms, and the aperture in each of the middle and outer cylindrical members are open to one side of the members to allow for axial movement of the cylindrical members and separation thereof.

Still further according to the invention the inner cylindrical member may be hollow to accomodate an axle of a pedal mechanism of a bicycle.

The invention also provides a vehicle frame including a suspension mechanism of the type described.

According to this aspect of the invention, the vehicle frame may be a bicycle frame or motorcycle frame.

In such a frame, the load bearing member may provide a seat support member, one support arm includes a rear wheel support fork and the other support arm is adapted to mount a steering mechanism and front wheel support fork.

The invention also provides a bicycle or motorcycle incorporating a suspension mechanism of the type described.

The invention also provides a hub comprising outer, middle and inner cylindrical members as described herein.

BRIEF DESCRIPTION OF THE DRAWINGS

An embodiment of the invention, will now be described, by way of example only, with reference to the accompanying drawings in which.

DETAILED DESCRIPTION OF THE DRAWINGS

Figure 1:
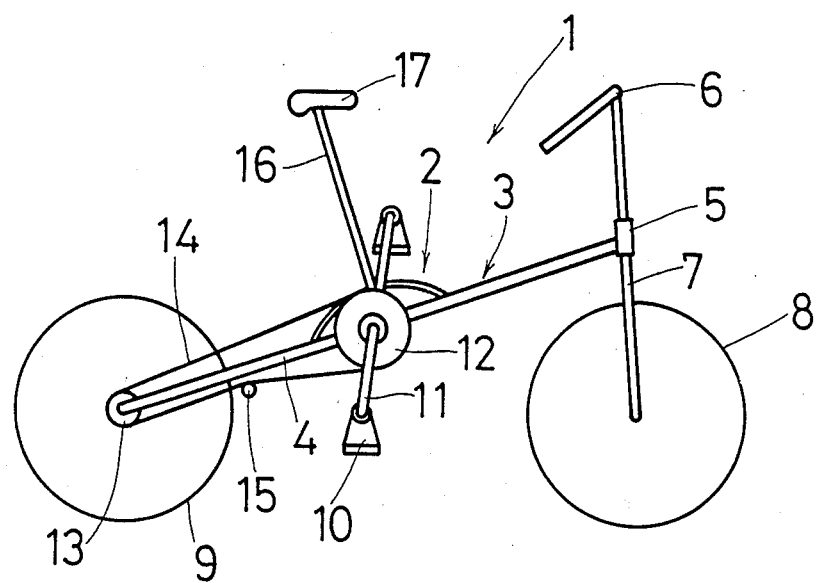
FIG. 1 is a side elevation of a bicycle including a suspension mechanism according to the invention.

In the illustrative embodiment of the invention a bicycle 1 comprises a central suspension mechanism 2 having a front support arm 3 and an oppositely directed rear support arm 4. The support arms are generally collinear.

The front support member 3 terminates in a steering mechanism 5 including handlebars 6 a front wheel support fork 7 and a front wheel 8.

The rear support arm 4 is in the form of a rear wheel support fork which supports a rear wheel 9.

The bicycle also includes the normal pedal mechanism comprising a pair of pedals 10 on pedal arms 11 which drive a front sprocket 12. The front sprocket 12 drives a rear sprocket 13 by means of a suitable drive chain 14 which is tensioned by a tensioning device 15.

The suspension mechanism 2 includes a load besring member in the form of a seat stalk 16 to which a seat 17 for the bicycle is mounted.

Figure 2:
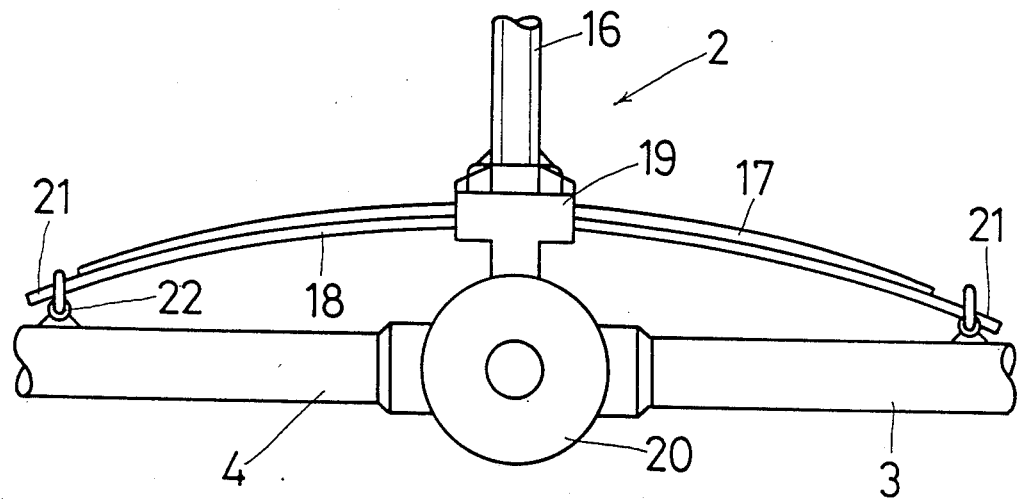
FIG. 2 is a more detailed side elevation of the suspension mechanism.

From FIG. 2 of the drawing, which shows the suspension mechanism 2 in greater detail, it can be seen that the front and rear support arms 3 and 4 are pivotally mounted with the axes of their pivot positions co-axial and fixed with respect to the load bearing member 16. Thus each of the support arms 3 and 4 can move in directions towards and away from the load bearing member 16. Arms 3 and 4 are normally generally collinear and are biased against moving towards the member 16 by a leaf spring set 17 which comprises a pair of leaf spring 18 firmly clamped by a clamping mechanism 19 on the load bearing member 16. The leaf spring set includes an aperture (not shown) therethrough through which the load bearing member 16 passes before terminating in the pivotal hub 20 supporting the front and rear support arms 2 and 3.

The two ends 21 of the lower spring 18 of the leaf spring set 17 are not fixed to the front and rear support arms 3 and 4. Rather, they are floating and bear against bearing formations in the form of small roller mountings 22 fixed to the two arms. In this way this leaf spring set exerts a biasing force away from the load bearing member 16 and so provides a comfortable suspension for the bicycle which may also be used in trick riding.

The pivotal hub 20 is depicted in greater detail in FIGS. 3 to 7 of the drawings.

Figure 3:
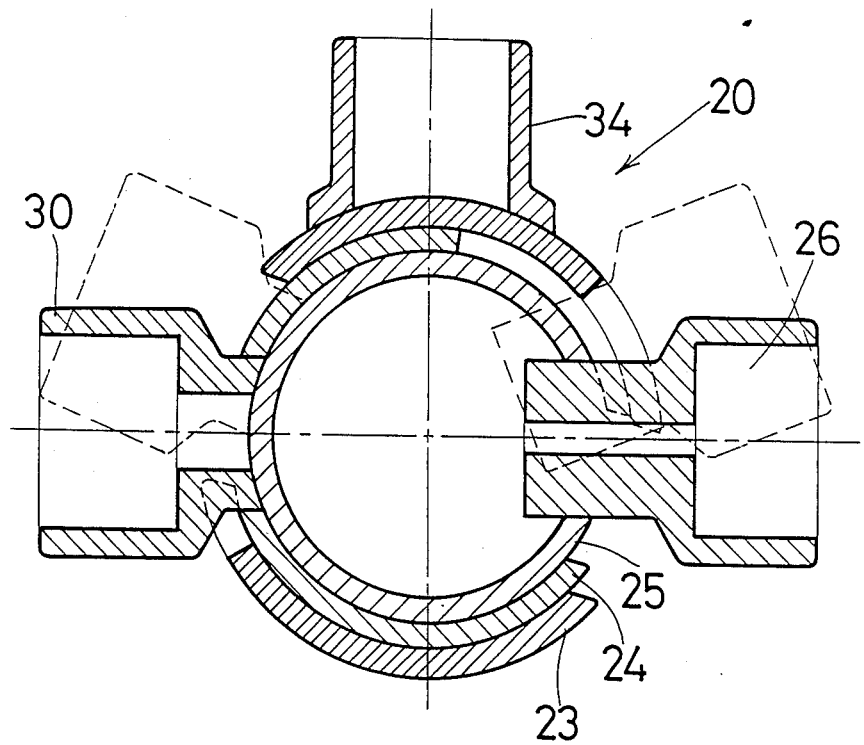
FIGS. 3 to 7 are various views of the components of the hub of the suspension mechanism.
Figure 4:
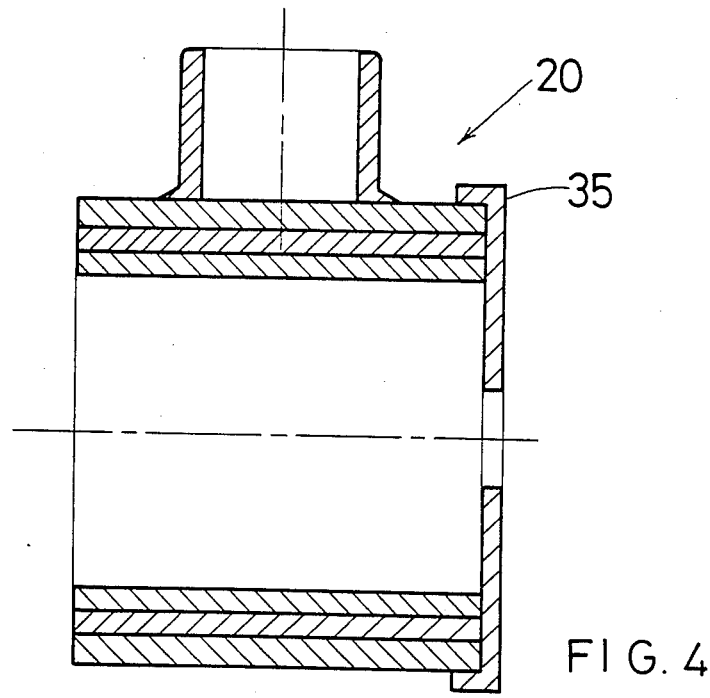

FIGS. 3 and 4 show that the pivotal hub 20 comprises 3 co-axial hollow cylindrical members 23, 24 and 25 having suitable bearing surfaces therebetween so as to allow them to freely rotate relative to each other. The bearing surfaces may be lubricated using suitable lubricants or made from self-lubricating material.

Mounted to the inner cylindrical member 25 is a short socket member 26 which is located in an aperture in the cylindrical wall of the cylindrical member 25 and which is welded in postion. The socket member 26 is provided for mounting of the front support arm 3 which may be inserted therein and welded in position.

Figure 5:
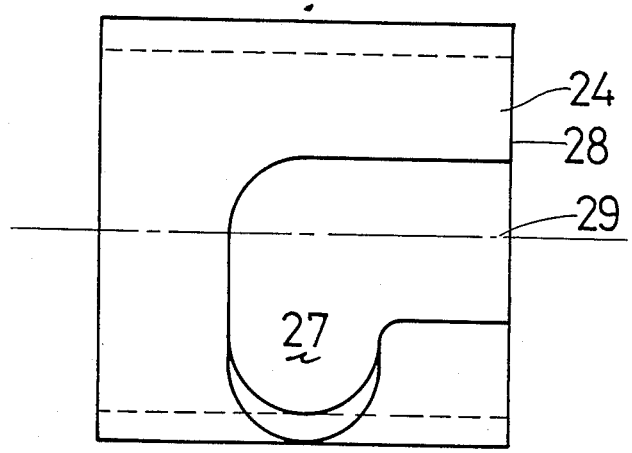
Figures 6, 7:
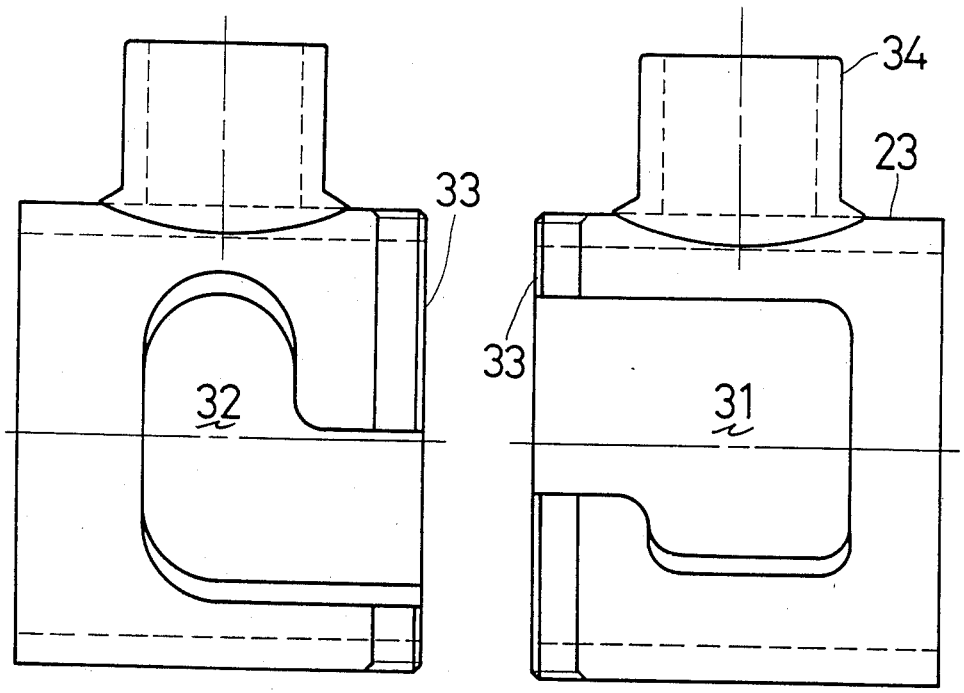

The socket member 26 projects through an aperture 27 in the cylindrical wall of the middle cylindrical member 24. This aperture 27 is centrally located along the width of the cylindrical wall but is open to one side 28 of the cylindrical member 24 by way of a slot 29 (FIG. 5). It will be appreciated that this is essential to enable the inner cylindrical member 25 to be inserted into the middle cylindrical member 24 and hence the socket member 26 into the slot 27. The slot 27 is rounded at each end to accomodate the socket member 26 and the length of the slot 27 is predetermined to allow for a desired pivotal movement of the inner cylindrical member with respect to the middle cylindrical member 24.

On the opposite side of the middle cylindrical member 24 from slot 27 there is a second socket member 30 which is substantially the same as the first socket member 26 and which is welded to the middle cylindrical member in a similar manner. The rear support arm 4 of the suspension mechanism, which as stated above is in the form of a rear wheel fork, is inserted into the socket of the socket member 30 and welded in position. The outer cylindrical member 23 is provided with two diametrically opposed slots 31 and 32 (FIGS. 6 and 7) for accommodating the front and rear socket members 26 and 30 respectively. Slots 31 and 32 are open to one side 33 of the cylindrical member 23 to facilitate insertion of the middle and inner members 24 and 25 into the outer member 23 and hence the socket members 26 and 30 into the slots 31 and 32.

The lengths of the slots 31 and 32 are such as to limit the degree of travel of the socket members 26 and 30 with respect to the outer cylindrical member 23.

A third socket 34 is welded to the outer cylindrical member 23 and serves as a mounting for the load bearing member (shaft) 16 received therein and welded in position.

To prevent axial movement of the three cylindrical members 23, 24 and 25, an annular cap 35 is threaded onto the outer cylindrical member 23 at side 33. This cap effectively closes all of the openings to the slots 27, 31 and 32.

Within the inner cylindrical member 25 are located suitable bearings (not shown) for supporting an axle for the pedal mechanism described above.

As previously mentioned, when the bicycle is unloaded (that is riderless), the support arms will be substantially collinear. When a rider is mounted on the bicycle, the support arms deviate slightly from their collinear positions and the leaf spring set takes up the load, biasing the support arms and hence the wheels away from the load bearing member carrying the saddle. The suspension mechanism is now operative and will adsorb additional loads such as are occasioned by bumps and the like. Furthermore, the suspension mechanism may be utilized for doing tricks and the like. By exerting a sudden downward force, the bicycle may be "jumped" for example.

In these actions the support arms are moved further from their collinear positions and the chain tensioner 15 maintains chain tension as the sprockets move closer together. This movement of the arms is shown in broken lines in FIG. 3.

From what has been described it is clear that the invention provides a novel suspension mechanism having unique characteristics and a relatively simple construction.

It will also be appreciated that because of the nature of the pivotal hub 20, the bicycle may easily be separated into basic component parts by removal of the retaining member 35 and separation of the cylindrical members of the hub.

Other embodiments are envisaged within the scope of the invention including other forms of biasing means such as elastomeric members, springs of plastics materials, coil springs in various configurations and fluid filled compression members. Furthermore, the suspension device may be used in a wide variety of vehicles, particularly wheeled vehicles such as motor bikes.

What is claimed is:

1. A vehicle frame having a suspension machanism including a hub comprising outer, middle and inner concentric members which are relatively rotatable within predetermined limits on a common axis, two generally oppositely directed support arms and a centrally located load-bearing member each mounted to a respective one of said outer member, said middle member and said inner member, said load-bearing member extending transversely to said common axis, and biasing means extending between each support arm and said load-bearing member for biasing the support arms to support loads applied to said load-bearing member in a direction transverse to said common axis.

2. A frame as claimed in claim 1 in which said support arms are substantially collinear.

3. A frame as claimed in claim 1 in which respective parts of said biasing means extending between said load-bearing member and each of said support arms are independently operable.

4. A frame as claimed in claim 3 in which each of said parts of said biasing means is fixed with respect to said load-bearing member and movable with respect to the corresponding support arm.

5. A frame as claimed in claim 1 in which said biasing means comprises one of the group consisting of elastomeric members, fluid-filled compression members, coil springs and leaf springs.

6. A frame as claimed in claim 1 in which said biasing means comprises a single leaf spring set, said load-bearing member is fixed substantially centrally of said leaf spring set, and said leaf spring set has opposite ends extending to said support arms, respectively.

7. A frame as claimed in claim 1 in which said outer member, said middle member and said inner member are generally cylindrical, said load-bearing member is mounted to said outer member, and said support arms are mounted to said middle member and said inner member, respectively.

8. A frame as claimed in claim 7 in which said support arms are substantially collinear.

9. A frame as claimed in claim 7 in which the support arm mounted to said inner member projects through respective first apertures in said middle and outer members, and the support arm mounted to said middle member projects through a second aperture in said outer member.

10. A frame as claimed in claim 9 in which at least one of said first apertures and said second aperture are configured to act as stops which limit pivotal movement of said support arms on said common axis by abutment with the respective support arms.

11. A frame as claimed in claim 9 in which the apertures in said middle and outer members are open to one side of said hub such that said middle member may be axially inserted into and removed from said outer member and said inner member may be axially inserted into and removed from said middle member.

12. A frame as claimed in claim 1 in which said inner member defines an internal opening for receiving an axle of a pedal mechanism of a bicycle.

13. A frame as claimed in claim 1 in which said load bearing member supports a seat, one of said support arms includes a rear-wheel support fork, and the other of said support arms includes means for mounting a steering mechanism and front-wheel support fork thereto.

14. A frame as claimed in claim 13, including chain drive means for driving a rear wheel received in said rear-wheel support fork, and tensioning means for maintaining tension on a chain of said chain drive means as said support arms rotate relative to one another on said common axis.

15. A hub for use in a bicycle suspension mechanism and the like, comprising a generally cylindrical outer member, a generally cylindrical middle member received coaxially within said outer member, and a generally cylindrical inner member received concentrically within said middle member, said outer, middle and inner members being rotatable relative to one another on a common axis, said middle member having first means for mounting an end of a first support arm thereto and said inner member having second means for mounting an end of a second support arm thereto.

16. A hub as claimed in claim 15 in which said first means comprises a first socket and said second means comprises a second socket disposed opposite said first socket.

17. A hub as claimed in claim 16 in which said first socket projects through respective first slots of said middle and outer members, and said second socket projects through a second slot of said outer member.

18. A hub as claimed in claim 17 in which at least one of said first slots is configured to limit relative rotational movement of said inner member by abutment with said first socket and said second slot is configured to limit relative rotational movement of said inner member by abutment with said second socket.

19. A hub as claimed in claim 15 in which said outer member carries socket means for receiving a load-bearing shaft.

* * * * *